(12) United States Patent
Nguyen et al.

(10) Patent No.: US 8,485,267 B2
(45) Date of Patent: Jul. 16, 2013

(54) HYDRA-CONNECTOR

(75) Inventors: Dennis P. Nguyen, Pearland, TX (US); Richard Altman, Cypress, TX (US)

(73) Assignee: Cameron International Corporation, Houston, TX (US)

( * ) Notice: Subject to any disclaimer, the term of this patent is extended or adjusted under 35 U.S.C. 154(b) by 251 days.

(21) Appl. No.: 12/937,369

(22) PCT Filed: Apr. 27, 2009

(86) PCT No.: PCT/US2009/041856
§ 371 (c)(1),
(2), (4) Date: Oct. 11, 2010

(87) PCT Pub. No.: WO2010/005619
PCT Pub. Date: Jan. 14, 2010

(65) Prior Publication Data
US 2011/0079399 A1    Apr. 7, 2011

Related U.S. Application Data

(60) Provisional application No. 61/061,995, filed on Jun. 16, 2008.

(51) Int. Cl.
*E21B 33/03* (2006.01)
(52) U.S. Cl.
USPC .......................... 166/378; 166/338; 166/75.13
(58) Field of Classification Search
USPC .............. 166/338, 340, 344, 345, 378, 75.14, 166/75.13, 96.1, 242.6, 242.7
See application file for complete search history.

(56) References Cited

U.S. PATENT DOCUMENTS

| 3,011,557 | A | * | 12/1961 | Conrad ......................... 166/212 |
| 3,209,829 | A |   | 10/1965 | Haeber |
| 3,321,217 | A | * | 5/1967  | Ahlstone ......................... 285/18 |
| 3,378,066 | A | * | 4/1968  | Otteman et al. .............. 166/346 |
| 3,427,048 | A | * | 2/1969  | Brown ............................. 285/18 |
| 3,452,815 | A | * | 7/1969  | Watkins ......................... 166/344 |
| 4,759,413 | A | * | 7/1988  | Bailey et al. ...................... 175/6 |
| 4,856,594 | A | * | 8/1989  | Jennings ....................... 166/338 |
| 4,997,043 | A | * | 3/1991  | Pringle ......................... 166/382 |
| 7,487,837 | B2 | * | 2/2009 | Bailey et al. .................. 166/345 |
| 2005/0034870 | A1 | * | 2/2005 | Buckle et al. ................. 166/368 |

FOREIGN PATENT DOCUMENTS
GB    2334273    8/1999

OTHER PUBLICATIONS

Collet Connector Comparison; Cameron; Jun. 1999.
PCT Search Report and Written Opinion of PCT Application No. PCT/US2009/041856 dated Oct. 22, 2009.

* cited by examiner

*Primary Examiner* — Kenneth L Thompson
(74) *Attorney, Agent, or Firm* — Fletcher Yoder, P.C.

(57) ABSTRACT

A hydraulic connector for a wellhead hub is provided that includes a piston and a bottom portion configured to move in an axial direction via hydraulic pressure applied to one or more hydraulic ports in the connector. The movement of the piston and the bottom portion moves a ring and a segment of the connector in a radial direction to engage recesses in the wellhead hub. The connector may be unlocked by applying hydraulic pressure to a hydraulic port of the connector. A system and method of operating the connector are also provided.

26 Claims, 11 Drawing Sheets

FIG. 10

HYDRA-CONNECTOR

CROSS-REFERENCE TO RELATED APPLICATIONS

This application claims priority to and benefit of PCT Patent Application No. PCT/US2009/041856, entitled "Hydra-Connector," filed Apr. 27, 2009, which is herein incorporated by reference in its entirety, and which claims priority to and benefit of U.S. Provisional Patent Application No. 61/061,995, entitled "Hydra-Connector", filed on Jun. 16, 2008, which is herein incorporated by reference in its entirety.

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

As will be appreciated, oil and natural gas have a profound effect on modern economies and societies. Indeed, devices and systems that depend on oil and natural gas are ubiquitous. For instance, oil and natural gas are used for fuel in a wide variety of vehicles, such as cars, airplanes, boats, and the like. Further, oil and natural gas are frequently used to heat homes during winter, to generate electricity, and to manufacture an astonishing array of everyday products.

In order to meet the demand for such natural resources, companies often invest significant amounts of time and money in searching for and extracting oil, natural gas, and other subterranean resources from the earth. Particularly, once a desired resource is discovered below the surface of the earth, drilling and production systems are often employed to access and extract the resource. These systems may be located onshore or offshore depending on the location of a desired resource. Further, such systems generally include a wellhead assembly through which the resource is extracted. These wellhead assemblies may include a wide variety of components, such as various casings, valves, fluid conduits, and the like, that control drilling and/or extraction operations. Additionally, such wellhead assemblies may also include components, such as an isolating mandrel ("frac mandrel") and/or fracturing tree, to facilitate a fracturing process.

Connectors are employed to attach certain types of equipment to wellhead housings. For example, one or more connectors are often employed to attach a blowout preventer (BOP) or a production tree to a wellhead. Unfortunately, existing connectors often require manual operation, multiple tools, multiple trips between a surface vessel and the subsea well equipment, and so forth. These operations to attach or remove a connector are generally expensive, time-consuming, and may introduce additional safety concerns.

BRIEF DESCRIPTION OF THE DRAWINGS

Various features, aspects, and advantages of the present invention will become better understood when the following detailed description is read with reference to the accompanying figures in which like characters represent like parts throughout the figures, wherein.

DETAILED DESCRIPTION OF SPECIFIC EMBODIMENTS

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Moreover, the use of "top," "bottom," "above," "below," and variations of these terms is made for convenience, but does not require any particular orientation of the components.

Certain exemplary embodiments of the present technique include a system and method that addresses one or more of the above-mentioned challenges of connecting equipment to a wellhead hub. As explained in greater detail below, the disclosed embodiments include a hydraulic connector having a ring and a "fast lock" segment that engage recesses or other mounting features on the wellhead hub. In certain embodiments, the hydraulic connector may include multiple hydraulic ports to receive hydraulic pressure to move components of the hydraulic connector in a generally axial direction. The axial movement of these components may activate radial movement of the ring and the fast lock segment, causing engagement with the wellhead hub and moving the connector into a locking position.

In certain embodiments, a first fluid pressure (e.g., hydraulic) causes a first axial displacement to induce a first radial force (and displacement) to secure the ring, and then a second fluid pressure (e.g., hydraulic) causes a second axial displacement to induce a second radial force (and displacement) to secure the one or more segments. Release of the hydraulic connector from the wellhead may also be facilitated by applying pressure to a hydraulic port to move components in a generally axial direction to cause disengage the ring and the segment and unlock the connector. In certain embodiments, a third fluid pressure (e.g., hydraulic) causes a third axial displacement to enable radial release of the one or more segments, and then the third fluid pressure causes a fourth axial displacement to enable radial release of the ring.

Figure 1:
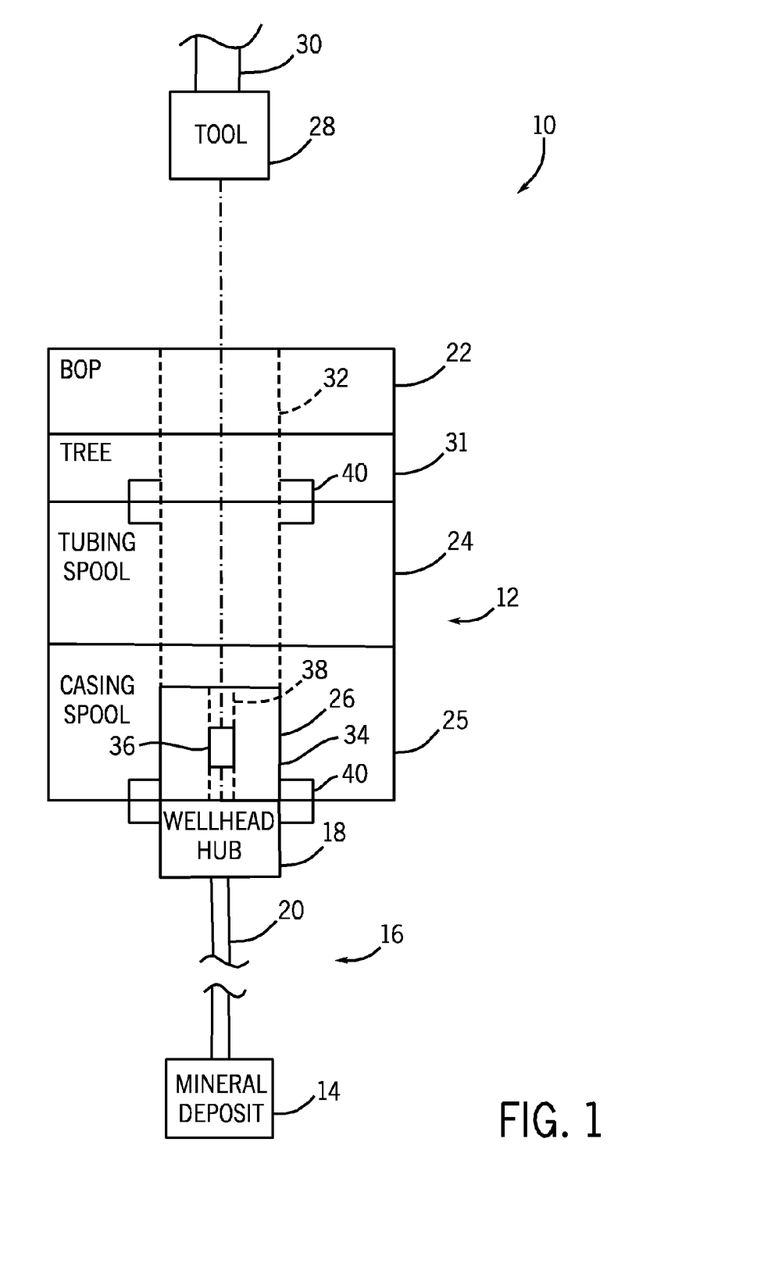
FIG. 1 is a block diagram that illustrates a mineral extraction system in accordance with an embodiment of the present invention.

FIG. 1 is a block diagram that illustrates a mineral extraction system 10 in accordance with an embodiment of the present invention. The illustrated mineral extraction system 10 can be configured to extract various minerals and natural resources, including hydrocarbons (e.g., oil and/or natural gas), or configured to inject substances into the earth. In some embodiments, the mineral extraction system 10 is land-based (e.g., a surface system) or subsea (e.g., a subsea system). As illustrated, the system 10 includes a wellhead 12 coupled to a mineral deposit 14 via a well 16, wherein the well 16 includes a wellhead hub 18 and a well-bore 20. The wellhead hub 18 generally includes a large diameter hub that is disposed at the termination of the well-bore 20. The wellhead hub 18 provides for the connection of the wellhead 12 to the well 16.

The wellhead 12 typically includes multiple components that control and regulate activities and conditions associated with the well 16. For example, the wellhead 12 generally includes bodies, valves and seals that route produced minerals from the mineral deposit 14, provides for regulating pressure in the well 16, and provides for the injection of chemicals into the well-bore 20 (e.g., down-hole). In the illustrated embodiment, the wellhead 12 includes what is colloquially referred to as a Christmas tree 22 (hereinafter, a tree), a tubing spool 24, a casing spool 25, and a hanger 26 (e.g., a tubing hanger or a casing hanger). The system 10 may include other devices that are coupled to the wellhead 12, and devices that are used to assemble and control various components of the wellhead 12. For example, in the illustrated embodiment, the system 10 includes a tool 28 suspended from a drill string 30. In certain embodiments, the tool 28 includes a running tool that is lowered (e.g., run) from an offshore vessel to the well 16 and/or the wellhead 12. In other embodiments, such as surface systems, the tool 28 may include a device suspended over and/or lowered into the wellhead 12 via a crane or other supporting device.

The tree 22 generally includes a variety of flow paths (e.g., bores), valves, fittings, and controls for operating the well 16. For instance, the tree 22 may include a frame that is disposed about a tree body, a flow-loop, actuators, and valves. Further, the tree 22 may provide fluid communication with the well 16. For example, the tree 22 includes a tree bore 32. The tree bore 32 provides for completion and workover procedures, such as the insertion of tools (e.g., the hanger 26) into the well 16, the injection of various chemicals into the well 16 (e.g., down-hole), and the like. Further, minerals extracted from the well 16 (e.g., oil and natural gas) may be regulated and routed via the tree 22. For instance, the tree 12 may be coupled to a jumper or a flowline that is tied back to other components, such as a manifold. Accordingly, produced minerals flow from the well 16 to the manifold via the wellhead 12 and/or the tree 22 before being routed to shipping or storage facilities. A blowout preventer (BOP) 31 may also be included, either as a part of the tree 22 or as a separate device. The BOP may consist of a variety of valves, fittings and controls to prevent oil, gas, or other fluid from exiting the well in the event of an unintentional release of pressure or an overpressure condition.

The tubing spool 24 provides a base for the tree 22. Typically, the tubing spool 24 is one of many components in a modular subsea or surface mineral extraction system 10 that is run from an offshore vessel or surface system. The tubing spool 24 includes a tubing spool bore 34. The tubing spool bore 34 connects (e.g., enables fluid communication between) the tree bore 32 and the well 16. Thus, the tubing spool bore 34 may provide access to the well bore 20 for various completion and worker procedures. For example, components can be run down to the wellhead 12 and disposed in the tubing spool bore 34 to seal-off the well bore 20, to inject chemicals down-hole, to suspend tools down-hole, to retrieve tools down-hole, and the like.

As will be appreciated, the well bore 20 may contain elevated pressures. Accordingly, the mineral extraction system 10 employs various mechanisms, such as seals, plugs and valves, to control and regulate the well 16. For example, plugs and valves are employed to regulate the flow and pressures of fluids in various bores and channels throughout the mineral extraction system 10. For instance, the illustrated hanger 26 (e.g., tubing hanger or casing hanger) is typically disposed within the wellhead 12 to secure tubing and casing suspended in the well bore 20, and to provide a path for hydraulic control fluid, chemical injections, and the like. The hanger 26 includes a hanger bore 38 that extends through the center of the hanger 26, and that is in fluid communication with the tubing spool bore 34 and the well bore 20. Unfortunately, pressures in the bores 20 and 34 may manifest through the wellhead 12 if not regulated. A back pressure valve, plug, or other sealing device 36 is often seated and locked in the hanger bore 38 to regulate the pressure. Similar sealing devices may be used throughout mineral extraction systems 10 to regulate fluid pressures and flows.

During operation of the well, the casing spool 25, the tubing spool 24, the blowout preventer 31 or other equipment may be attached to the wellhead 12 via an exemplary hydraulic connector 40. As described further below, the connector 40 may facilitate connection of the tree 22, the blow-out-preventer 31, drilling-tools, or various other tubular devices for oilfield use, to the wellhead hub 18. The hydraulic connector 40 is secured to the wellhead assembly 12 so as to withstand the internal pressures within the wellhead assembly 12 and the attached components. To facilitate the secure connection, the wellhead 12 or other equipment may also include one or more recesses, such as grooves around the circumference of the wellhead hub 18, to engage components of the hydraulic connector 40. Advantageously, the hydraulic mechanism of the hydraulic connector 40 may be activated by a hydraulic connection or a simple ROV, thereby reducing the complexity of operation, reducing or eliminating the need for an operator to manually operate the connection, especially in subsea operations, and improving the safety typically involved in more complex connectors.

Figure 2:
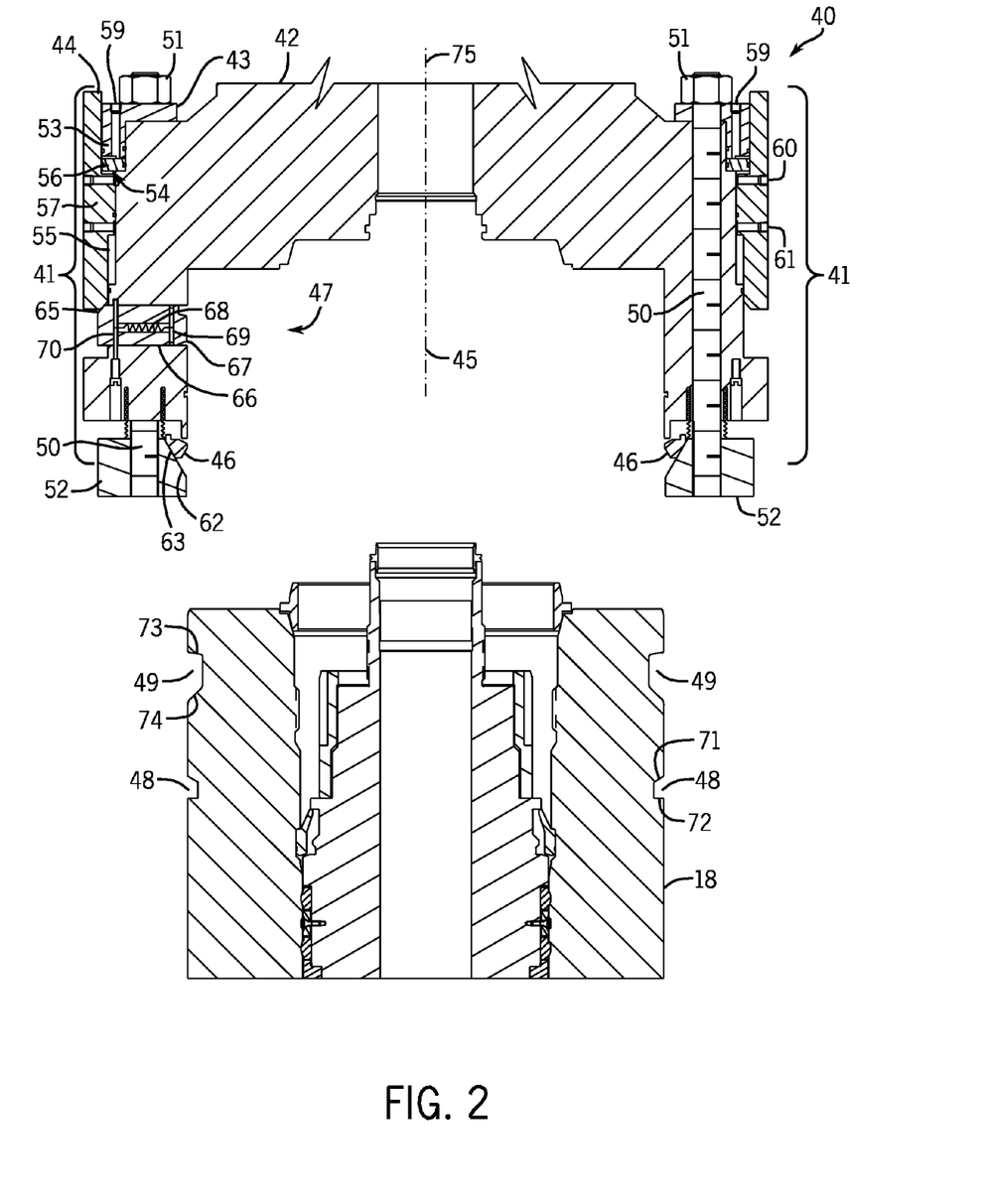
FIG. 2 depicts a cross-section of a hydraulic connector separate from a wellhead hub in accordance with an embodiment of the present invention.

FIG. 2 illustrates a cross-section of the connector 40 detached from a wellhead assembly 12, showing a first step in the installation of the connector 40 onto the wellhead hub 18.

In this first step, the connector 40 is not secured to the wellhead hub 18, but it rests on top of the wellhead hub 18. In the illustrated embodiment, the connector 40 includes an assembly 41 of a plurality of coaxial members axially secured together with at least two degrees of freedom (e.g., axial and radial), such that both axial and radial displacement is employed to secure the connector 40 onto the wellhead hub 18. As discussed below, in a second stage of the installation process, the connector 40 undergoes a first series of axial and radial displacements to cause a first engagement with the wellhead hub 18. In a third stage of the installation process, the connector 40 undergoes a second series of axial and radial displacements to cause a second engagement with the wellhead hub 18. Thus, the installation process results in a plurality of separate engagements in sequential steps of both axial and radial displacements of components within the assembly 41.

In the illustrated embodiment, the assembly 41 includes a central member 42, an inner annular member or first piston 43 disposed about the central member 42, and an outer annular member or second piston 44 disposed about the central member 42 and the first piston 43. The first piston 43 is configured to move axially relative to both the central member 42 and the second piston 44. The second piston 44 is configured to move axially relative to both the central member 42 and the first piston 43. As discussed below, the first and second pistons 43 and 44 are configured to move independent from one another along an axis 45 of the connector 40, such that axial movement biases a first fastener (e.g., a lock ring) 46 and a second fastener (e.g., one or more segments) 47 to move radially into engagement with mating fasteners (e.g., recesses) 48 and 49 on the wellhead hub 18. The range of axial movement is restricted by one or more studs or bolts 50, which extend through the various components and block movement at opposite ends via upper nuts 51 and a lower portion (e.g., a ring) 52. The first piston 43, the studs or bolts 50, the nuts 51, and the lower portion 52 generally move together in upward and downward directions along the axis 45 in response to fluid pressure. Similarly, second piston 44 generally moves in upward and downward directions along the axis 45 in response to fluid pressure.

In the illustrated embodiment, the first and second pistons 43 and 44 generally move along the axis 45 in response to fluid pressure (e.g., liquid or gas) in a first chamber 53, a second chamber 54, and/or a third chamber 55. As illustrated, the first chamber 53 is an annular chamber defined between a bottom portion of the first piston 43 and a floating piston 56. The second chamber 54 is an annular chamber defined between the floating piston 56 and an inner piston portion 57 (e.g., inner annular lip) of the second piston 44. The third chamber 55 is an annular chamber defined between a bottom portion 58 (e.g., outer annular lip) of the central member 42 and the inner piston portion 57 (e.g., inner annular lip) of the second piston 44. The first chamber 53 receives fluid from a first fluid port 59. The second chamber 54 receives fluid from a second fluid port 60. The third chamber 55 receives fluid from a third fluid port 61. The fluid ports 59, 60, and 61 may be connected to a source of liquid pressure (e.g., hydraulic fluid), a source of gas pressure (e.g., air), or another liquid or gas.

The first fastener 46 is responsive to movement of the lower portion 52, which is responsive to movement of the first piston 43. Fluid pressure in the first fluid chamber 53 causes upward axial movement of the first piston 43, the stud or bolt 50, the nut 51, and the lower portion 52. The lower portion 52 includes a first energizing taper 62, which engages a mating taper 63 on the first fastener 46 (e.g., ring). Thus, as the lower portion 52 moves upward in response to the fluid pressure against the first piston 43, the tapers 62 and 63 slide along one another to force the first fastener 46 to move in an inward radial direction toward the axis 45. In certain embodiments, the first fastener 46 may be a snap ring, a C-ring, a lock ring, or any other suitable fastener.

The second fastener 47 is responsive to movement of the second piston 44. Fluid pressure in the second fluid chamber 54 causes upward axial movement of the floating piston 56 until it engages and stops at the first piston 43. In turn, the fluid pressure in the second fluid chamber 54 causes downward axial movement of the second piston 44. The second piston 44 includes a second energizing taper 64, which engages a mating taper 65 on the second fastener 47 (e.g., a "fast-lock" segment). In certain embodiments, the second fastener 47 includes a ring-shaped body 66 supporting one or more segments 67, which are configured to move back and forth in opposite radial directions. The second fastener 47 also includes a spring 68 coupled to each segment 67 at a pin 69, wherein the spring 68 is also coupled to the ring-shaped body 66 at a corresponding pin 70. In the illustrated embodiment, the spring 68 may be disposed in a compressed or uncompressed state. The spring 68 biases the respective segment 67 in an inward radial direction toward the axis 45. As the energizing taper 64 moves downward in response to the fluid pressure against the second piston 44, the tapers 64 and 65 slide along one another to force the second fastener 47 (i.e., the one or more segments 67) to move in an inward radial direction toward the axis 45.

As the first and second fasteners 46 and 47 move in radial inward directions, the fasteners 46 and 47 engage the mating fasteners 48 and 49. In certain embodiments, the mating fasteners 48 and 49 may be indentations, grooves, or other topographies, and may be machined or created in any shape, depth, or angle to better facilitate engagement with the first and second fasteners 46 and 47. In certain embodiments, the mating fasteners 48 and 49 may include upper and lower lips to block axial movement of the fasteners 46 and 47 after engagement with the mating fasteners 48 and 49. For example, the mating fastener 48 includes upper and lower lips 71 and 72, which are angled (e.g., at an angle greater than 0 degrees relative to the axis 45) to block axial movement of the first fastener 46. By further example, the mating fastener 49 includes upper and lower lips 73 and 74, which are angled (e.g., at an angle greater than 0 degrees relative to the axis 45) to block axial movement of the second fastener 47.

In the presently illustrated embodiment, the connector 40 includes a bore 75 configured to receive various additional components. For example, in one embodiment, various additional components, such as hangers, pipes, tubing, wellhead members, other fluid conduits, or the like may be received within the bore 75 of the connector 40.

Figure 3:
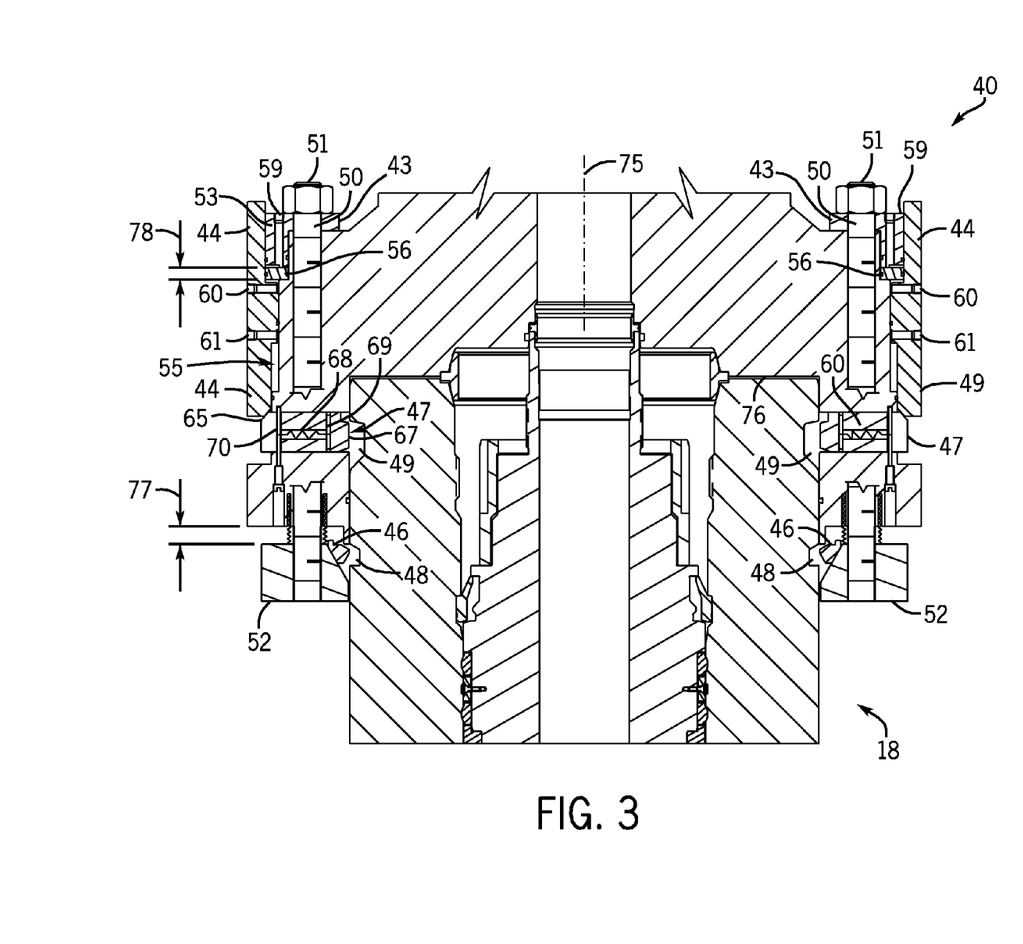
FIG. 3 depicts a cross-section of the hydraulic connector lowered onto a wellhead hub in accordance with an embodiment of the present invention.

FIG. 3 illustrates a cross-section of the connector 40 lowered onto the wellhead hub 18 in preparation for creating a locking connection. As shown in FIG. 3, the connector 40 may be lowered onto the wellhead hub 18, leaving a gap between so that the bottom surface 76 of the connector 40 and the wellhead hub 18. The locking of the connector 40, as described below, engages the connector 40 flush with the wellhead hub 18. After the initial installation, the ring 46 and the segment 67 are not engaged with the recesses 48 and 49 respectively of the wellhead hub 18. The lower portion 52 of the connector 40 is in a first position separated from the upper portion of the assembly 41, as indicated by an axial gap 77. The pistons 43 and 44 are also compressed tightly about the floating piston 56 as indicated by axial distance 78, such that the first and second chambers 53 and 54 are at a minimum volume. In this stage, the tapers 62 and 63 do not bias the ring 46 into the recess 48, and the tapers 64 and 65 do not bias the segments 67 into the recess 49.

Figure 4:
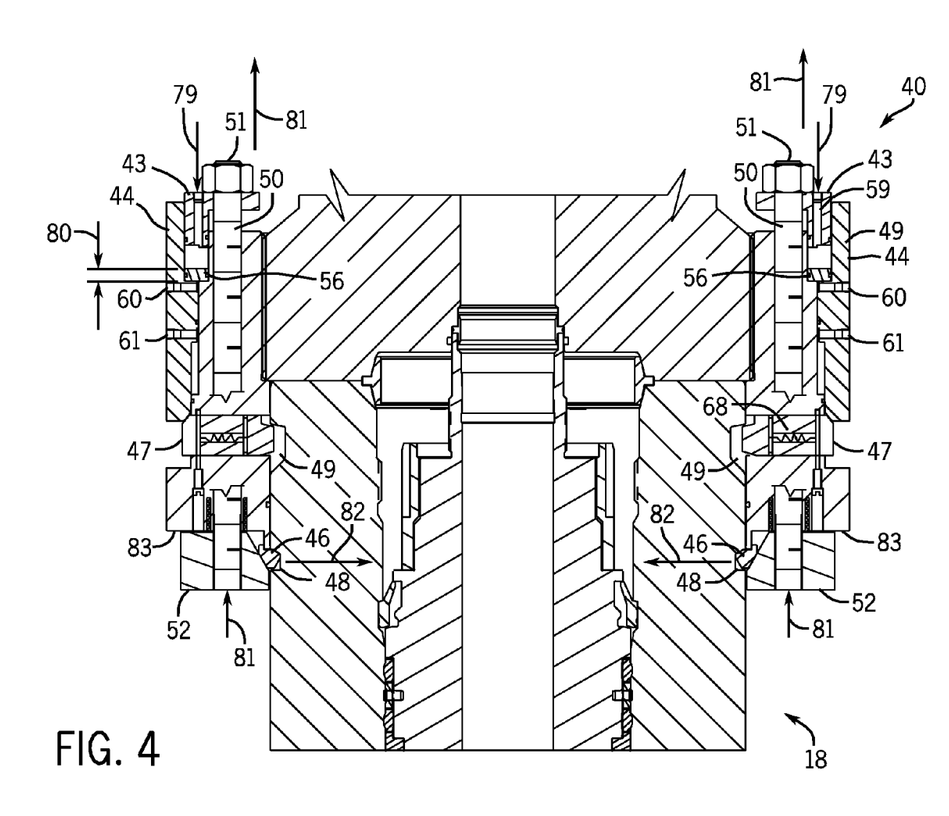
FIG. 4 depicts a cross-section of the hydraulic connector showing a ring of the connector in a locking position with the wellhead hub in accordance with an embodiment of the present invention.

FIG. 4 illustrates a cross-section of the connector 40 showing actuation of the first piston 43 to energize and engage the first fastener 46 (e.g., ring) with the mating fastener 48 (e.g., recess) on the wellhead hub 18. As discussed above, the first fastener 46 is responsive to movement of the lower portion 52, which is responsive to movement of the first piston 43. Thus, in the illustrated embodiment, a first fluid pressure flows through the first port 59 into the first chamber 53 as indicated by arrow 79, thereby causing axial expansion 80 of the first chamber 53 via upward movement 81 of the first piston 43. In turn, the upward movement 81 of the first piston 43 also causes upward movement of the stud or bolt 50, the nut 51, and the lower portion 52. As the lower portion 52 undergoes the upward movement 81, the energizing taper 62 slides along the mating taper 63 on the first fastener 46 (e.g., ring), thereby creating a radial biasing force and causing radial inward movement 82 of the first fastener 46 (e.g., ring) into the mating fastener 48 (e.g., recess). The engagement of tapers 62 and 63 also gradually guides the ring 46 into the mating recess 48. Eventually, the lower portion 52 abuts a bottom surface 83 of the assembly 41, thereby blocking further axial movement. At this point, the engagement between the fasteners 46 and 48 (e.g., ring and recess) provides a first stage of securement between the connector 40 and the wellhead hub 18. Again, the first stage involves both axial movement 81 and radial movement 82 to achieve securement via the fasteners 46 and 48 (e.g., ring and recess), so that the connector 40 is flush with the wellhead hub 18.

Figure 5:
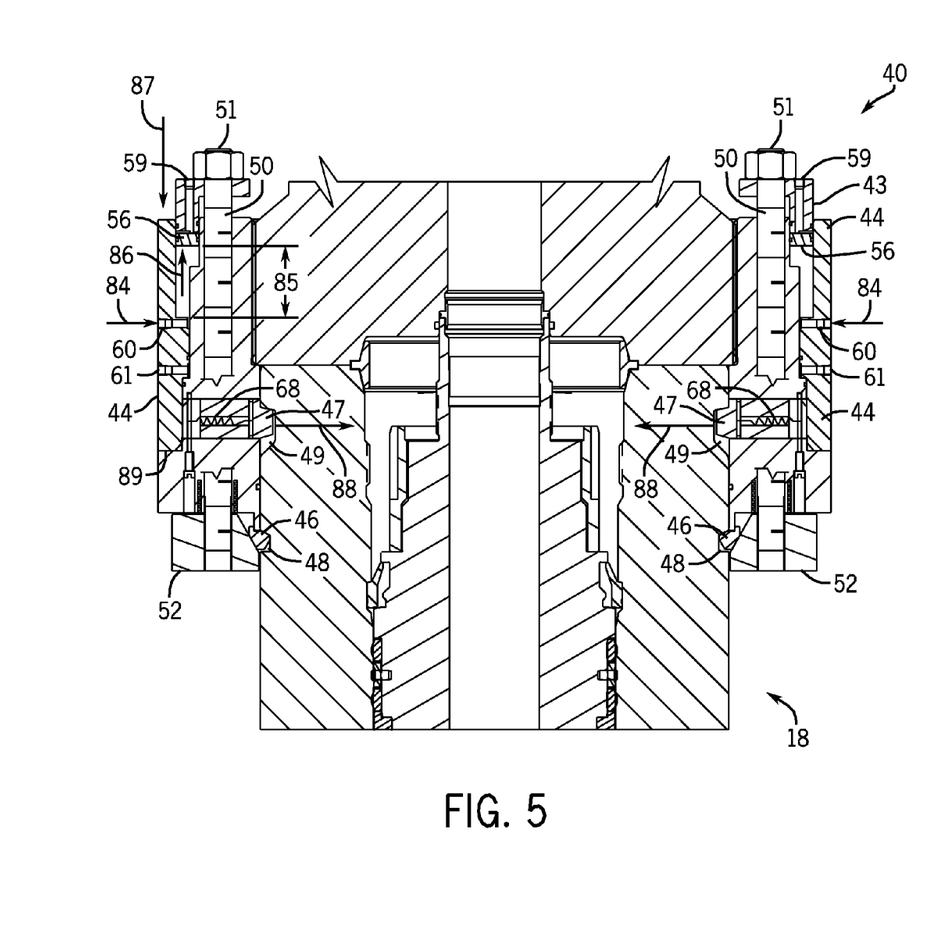
FIG. 5 depicts a cross-section of the hydraulic connector showing a segment of the connector in a locking position with the wellhead hub in accordance with an embodiment of the present invention.

FIG. 5 illustrates a cross-section of the connector 40 showing actuation of the floating piston 56 and the second piston 44 to energize and engage the second fastener 47 (e.g., one or more segments 67) with the mating fastener 49 (e.g., recess) on the wellhead hub 18. As discussed above, the second fastener 47 is responsive to movement of the second piston 44. Thus, in the illustrated embodiment, a second fluid pressure flows through the second port 60 into the second chamber 54 as indicated by arrow 84, thereby causing axial expansion 85 of the second chamber 54 via upward movement 86 of the floating piston 56. In turn, the upward movement 86 of the floating piston 56 causes axial contraction of the first chamber 53 until the floating piston 56 engages the first piston 53, such that the first chamber 53 is at a minimum volume. In this manner, the second fluid pressure (and upward movement of the floating piston 56) further biases, maintains, or retains the first piston 43 in the upmost axial position, such that the lower portion 52 maintains the first fastener 46 (e.g., ring) in an engaged position with the mating fastener 48 (e.g., recess). In other words, the additional pressure applied to the second port 60 may create a pre-load on the first piston 43, the lower portion 52, and thus the first fastener 46 (e.g., ring).

In addition to the pressure against the first piston 43, the expansion 85 of the second chamber 54 causes downward axial movement 87 of the second piston 44. As the second piston 44 undergoes the downward movement 87, the second energizing taper 64 of the second piston 44 slides along the mating taper 65 of the second fastener 47 (e.g., a "fast-lock" segment). The sliding engagement of the tapers 64 and 65 creates a radial biasing force and causes a radial inward movement 88 of the second fastener 47 (e.g., one or more segments 67) into the mating fastener 49 (e.g., recess). In addition, the spring 68 biases the segment in a radial inward direction, thereby further inducing the radial inward movement 88 of the segment 67 into the mating recess 49. In this manner, the spring 68 expands from a retracted state to an expanded state. The engagement of tapers 64 and 65 also gradually guides the one or more segments 67 into the mating recess 49. Eventually, the second piston 44 abuts a bottom surface 89 of the assembly 41, thereby blocking further axial movement. Additionally, the engagement of the upper lip 73 of the mating recess 49 with the segment 67 creates a pre-load on the connector 40. At this point, the engagement between the fasteners 47 and 49 (e.g., one or more segments and recesses) provides a second stage of securement between the connector 40 and the wellhead hub 18. Again, the second stage involves both axial movement 87 and radial movement 88 to achieve securement via the fasteners 47 and 49 (e.g., one or more segments and recesses).

Figure 6:
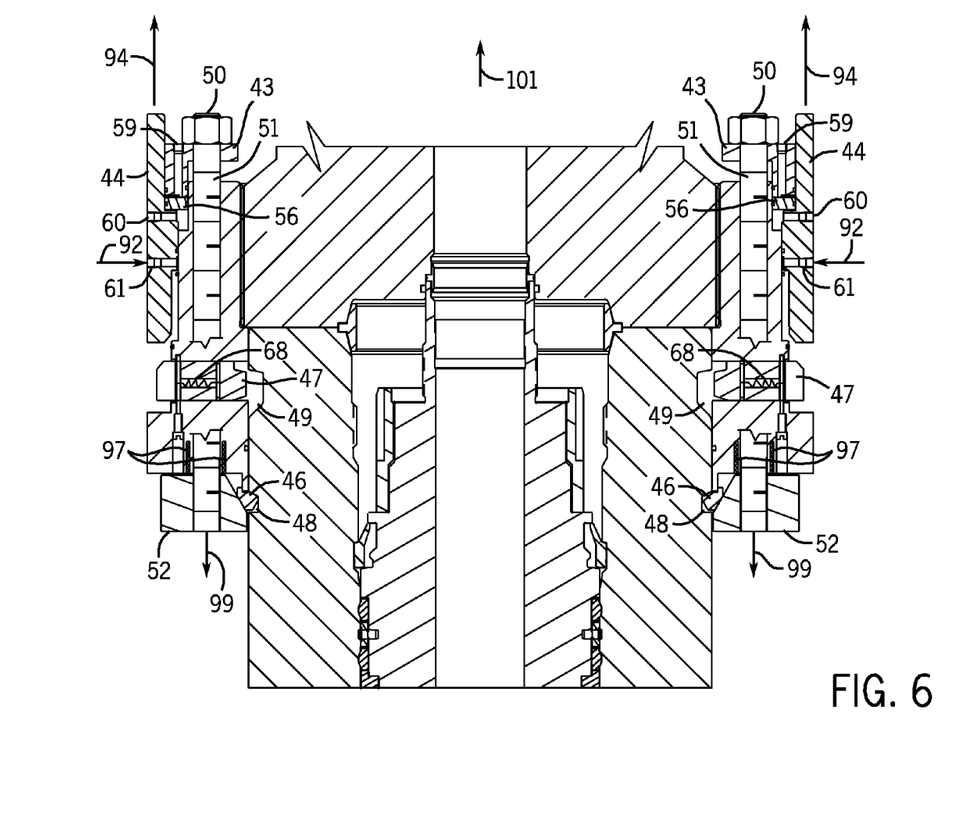
FIG. 6 depicts a cross-section of the hydraulic connector during unlocking and removal from the wellhead hub in accordance with an embodiment of the invention.

FIG. 6 depicts a cross-section of the connector 40 during disengagement and removal from the wellhead hub 18 in accordance with an embodiment of the invention. In the illustrated embodiment, the first and second fasteners 46 and 47 are both disengaged in response to a third fluid pressure applied to the third port 61 as indicated by arrow 92. In response to fluid pressure into the third port 61, the second piston 44 moves in an upward axial direction generally indicated by arrow 94. Because the piston 44 is no longer engaged with the segment 67, the tension in the spring 68 retracts the segment in the generally radial direction indicated by arrow 96, disengaging the segment 67 from the recess 49. In an embodiment, movement of the piston 44 may open a pressure release for the hydraulic applied to the third port 61. To facilitate unlocking of the lower portion 52 and the ring 46, the lower portion 52 may be coupled to the body 41 of the connector 40 via one or more internal springs 97. The springs 97 bias the lower portion 52 in the generally axial direction indicated by arrow 99. After the hydraulic pressure applied to the third port 61 moves the piston 44, the springs 97 push the lower portion 52 in the direction indicated by arrow 99, disengaging the ring 46 from the recess 48 of the wellhead hub 18. The connector 40 may then be removed by moving the connector 40 in the generally axial direction indicated by arrow 101.

Figure 7A:
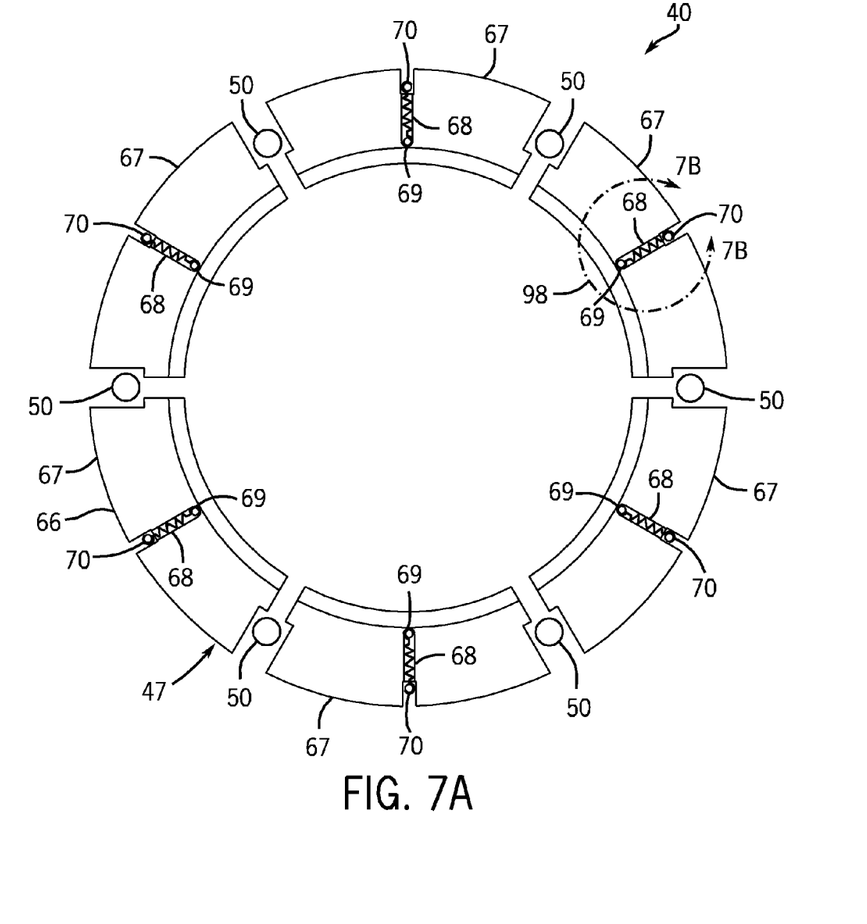
FIGS. 7A and 7B depict another cross-section of the hydraulic connector of FIGS. 2-6 in accordance with an embodiment of the present invention.
Figure 7B:
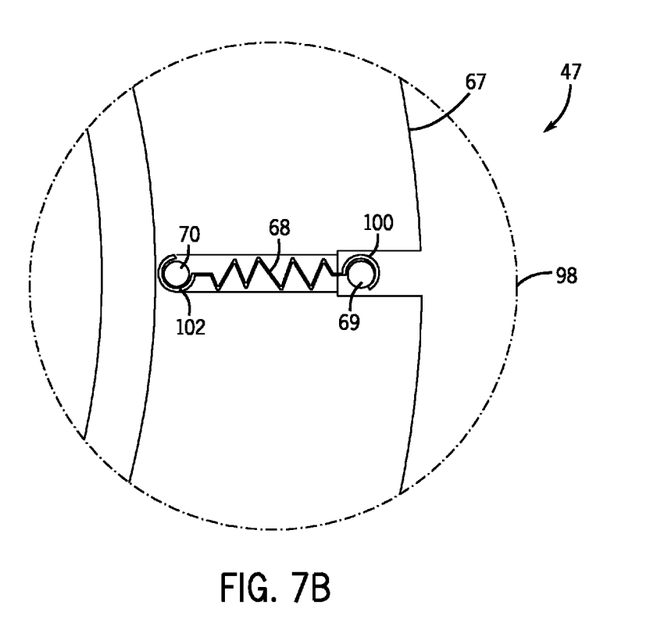

FIGS. 7A and 7B depict top cross-section views of the second fastener 47 illustrating some of the components discussed above. FIG. 7A illustrates a top cross-section view of the second fastener 47 having the studs or bolts 50 and the segments 67 arranged in a circular arrangement. As discussed above, each segment 67 includes the spring 68 secured via the first pin 69 and the second pin 70. FIG. 7B depicts a close-up top cross-section view of a circled area 98 of FIG. 7A further illustrating the spring 68. In one embodiment, as shown in FIG. 7B, the spring 68 may include hooks on either end for securing to the pins 69 and 70. For example, the spring 68 may include a first hook 100 secured to the first pin 69 and a second hook 102 secured to the second pin 70. When installing or removing the connector 40, the spring 68 may be in tension until the segment 67 is aligned with the mating fastener 49 (e.g., recess) in the wellhead hub 18. When the connector 40 is placed into a locking position, such as through use of the fluid ports 59 and 60 as discussed above, the segment 67 is aligned with the recess 49 so that the spring 68 can expand and allow the segment 67 to engage the recess.

Figure 8:
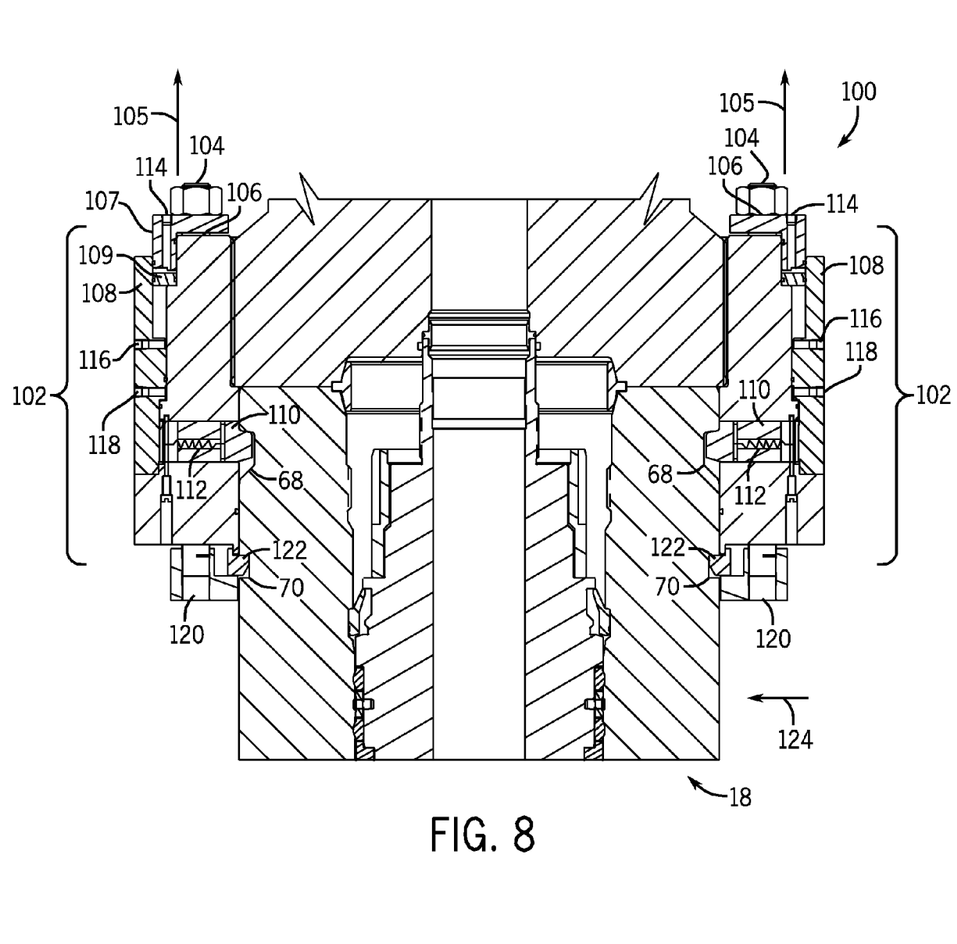
FIG. 8 depicts a hydraulic connector in accordance with an alternate embodiment of the present invention.

FIG. 8 depicts a cross-section of a connector 100 in accordance with an alternate embodiment of the present invention. The connector 100 has many components similar to the embodiment described above, such as a body 102, a nut 104 and stud or bolt 106, a first piston 107, a second piston 108, a floating piston 109, a segment 110 having a spring 112, and so forth. Additionally, the connector 100 includes a first hydraulic port 114, a second hydraulic 116, and a third hydraulic port 118. However, in contrast to the embodiment described in FIGS. 2-7, the connector 100 includes a bottom portion 120 that is manually engaged to the wellhead 18. For example, the bottom portion 120 may include a ring 122, such as a snap ring, a lock ring, a C-ring, etc., that is configured to radially engage the recess 48 of the wellhead hub 18. During locking of the connector 40, the ring 122 of the bottom portion 120 may be manually moved in a radial direction indicated by arrow 124, so as to engage the recess 48. The segment 110 may be moved in a radial direction via movement of the second piston 108 through hydraulic pressure applied at the second hydraulic port 116, as described above. Similarly, during unlocking of the connector 40, the ring 122 may be manually moved in the opposite direction of the arrow 124, while the third hydraulic port 118 may be used to disengage the segment 110. To manually remove the connector 40, the stud or bolt 106 may be unscrewed or otherwise removed from the lower portion 120, such as by removing in the direction generally indicated by arrow 105, allowing the connector 40 to be removed while leaving the lower portion 120 engaged with the wellhead hub 18.

Figure 9:
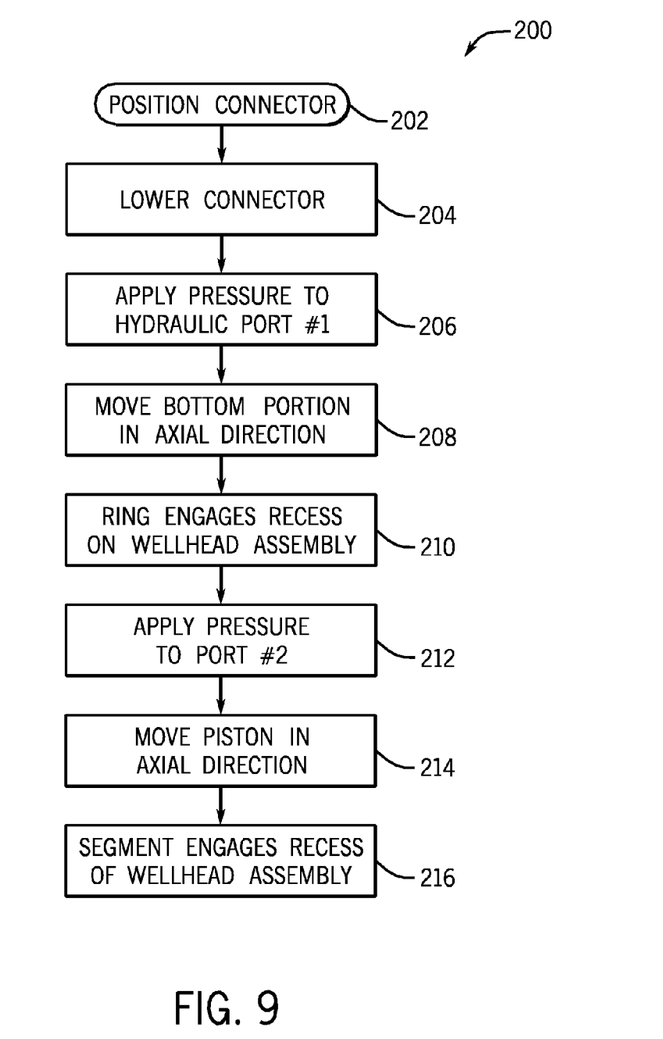
FIG. 9 is a flowchart of a process for installing the hydraulic connector of FIGS. 2-7 on the wellhead hub in accordance with an embodiment of the present invention.

FIG. 9 depicts an embodiment of a process 200 for installing the connector 40 into a locking position on the wellhead hub 18. In certain embodiments, the process 200 may be used for connection of a variety of components, such as hangers, pipes, tubing, wellhead members, other fluid conduits, or the like, to the wellhead hub 18. Initially, the connector 40 may be positioned and aligned over the wellhead hub 18 (block 202). The connector 40 is then lowered onto the wellhead hub 18 so that the ring 46 and the segment 67 are aligned with the corresponding recesses 48 and 49 on the wellhead hub 18 (block 204). To lock the connector 40 with the wellhead hub 18, hydraulic pressure may be applied to the first hydraulic port 59 (block 206), as described above, such as through a remote control system using hydraulic fluid. The pressure causes the lower portion 52 of the connector 40 to move in an axial direction (block 208) and engage the ring 46 with the wellhead hub 18 (block 208). To complete the connector 40 into a locking position, pressure may be applied to the second hydraulic port 60 (block 212), moving the second piston 44 in an axial direction (block 214). As the piston 44 moves, it engages the segment 67, causing the segment 67 to move radially and engage with the corresponding recess 49 of the wellhead hub 18 (block 216).

Figure 10:
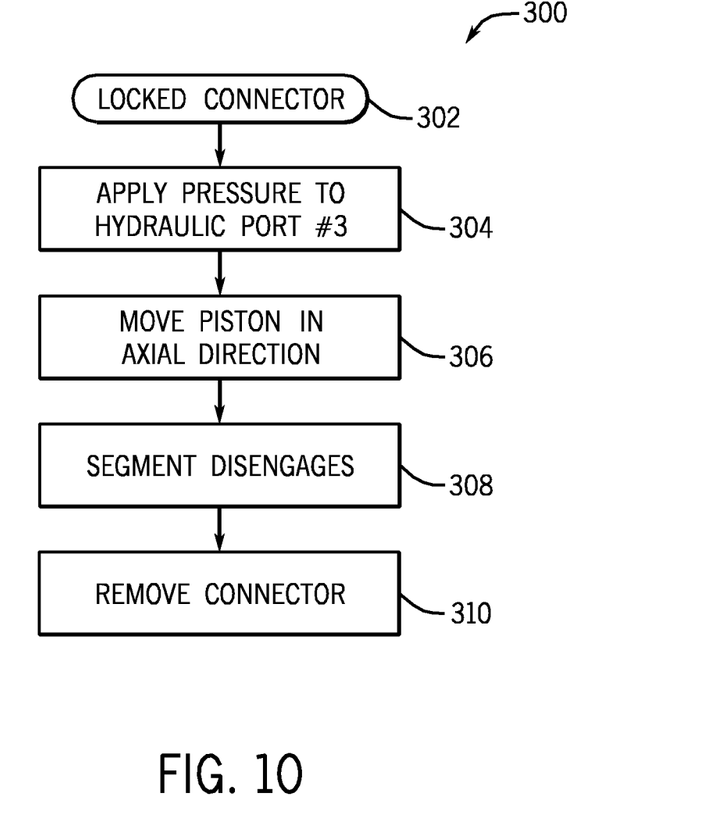
FIG. 10 is a flowchart of a process for removing the hydraulic connector of FIGS. 2-7 from the wellhead hub in accordance with an embodiment of the present invention.

FIG. 10 illustrates an embodiment of a process 300 for removing the connector 40 coupled to the wellhead hub 18 in a locking position. With the connector 40 is in a locked position (block 302), hydraulic pressure may be applied to the third hydraulic port 61 (block 304). In response to the hydraulic pressure, the second piston 44 moves in an axial direction away from the segment 67, allowing movement of the segment 67 in a radial direction away from the wellhead hub 18 as the spring 60 retracts the segment 67. The segment 67 disengages from the recess 49 of the wellhead hub 18, unlocking the connector 40. After the connector 40 is unlocked, the connector 40 may be removed from the wellhead hub 18 by moving the connector 40 in an axial direction, thus disengaging the ring 46. As the connector 40 is removed, the ring 46 may automatically disengage from the wellhead hub 18, as there is no longer any hydraulic pressure exerted to pull the lower portion 52 into engagement with the recess 48.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A fluid-driven connector for mineral extraction equipment, comprising:
   a first piston configured to move axially relative to an axis of the fluid-driven connector with a first axial range of movement responsive to a first fluid pressure applied to a first fluid chamber;
   a first fastener configured to move radially relative to the axis of the fluid-driven connector with a first radial range of movement responsive to the first axial range of movement of the first piston;
   a second piston configured to move axially relative to the axis of the fluid-driven connector with a second axial range of movement responsive to a second fluid pressure applied to a second fluid chamber; and
   a second fastener configured to move radially relative to the axis of the fluid-driven connector with a second radial range of movement responsive the second axial range of movement, wherein the first and second pistons are disposed in a coaxial arrangement one around another.

2. The fluid-driven connector of claim 1, wherein the first axial range of movement is in a first axial direction to bias the first fastener in the first radial range of movement, the second axial range of movement is in a second axial direction to bias the second fastener in the second radial range of movement, and the first and second axial directions are opposite from one another.

3. The fluid-driven connector of claim 1, comprising a floating piston separating the first fluid chamber from the second fluid chamber.

4. The fluid-driven connector of claim 3, wherein the first chamber expands between the first piston and the floating piston during the first range of axial movement, and the second chamber expands between the second piston and the floating piston during the second range of axial movement.

5. The fluid-driven connector of claim 1, wherein the first fastener comprises a ring-shaped fastener having a first taper that interfaces with a first energizing taper biased by the first piston.

6. The fluid-driven connector of claim 1, wherein the second fastener comprises a segment having a second taper that interfaces with a second energizing taper biased by the second piston.

7. The fluid-driven connector of claim 6, wherein the segment comprises a spring biasing the segment in a radial direction.

8. The fluid-driven connector of claim 1, wherein at least one of the first or second fluid chambers is disposed directly between the first and second pistons.

9. The fluid-driven connector of claim 8, wherein the first piston is a first annular piston, the second piston is a second annular piston, and the first and second annular pistons overlap one another along an interface.

10. The fluid-driven connector of claim 9, comprising at least one annular seal disposed along the interface.

11. The fluid-driven connector of claim 3, wherein the first piston, the second piston, and the floating piston are disposed in the coaxial arrangement one around another.

12. The fluid-driven connector of claim 11, wherein the first piston is configured to move axially away from the second piston and the floating piston to cause the first fastener to move radially with the first radial range of movement, wherein the second piston is configured to move axially away from the first piston and the floating piston to cause the second fastener to move radially with the second radial range of movement.

13. The fluid-driven connector of claim 1, wherein the second fastener comprises a segmented fastener having a plurality of radially movable segments disposed in an annular configuration.

14. The fluid-driven connector of claim 1, comprising one or more components of the mineral extraction equipment having the fluid-driven connector.

15. A fluid-driven connector, comprising:
a first piston having a first axial range of movement responsive to a first fluid pressure applied to a first fluid chamber;
a first fastener having a first radial range of movement responsive to the first axial range of movement of the first piston;
a second piston having a second axial range of movement responsive to a second fluid pressure applied to a second fluid chamber;
a second fastener having a second radial range of movement responsive the second axial range of movement; and
a floating piston separating the first fluid chamber from the second fluid chamber.

16. The fluid-driven connector of claim 15, wherein the first chamber expands between the first piston and the floating piston during the first range of axial movement, and the second chamber expands between the second piston and the floating piston during the second range of axial movement.

17. A method for connection of equipment, comprising:
axially moving a first piston along a first axial range of movement in response to a first fluid pressure applied to a first fluid chamber;
radially moving a first fastener along a first radial range of movement in response to the first axial range of movement of the first piston;
axially moving a second piston along a second axial range of movement in response to a second fluid pressure applied to a second fluid chamber; and
radially moving a second fastener along a second radial range of movement in response to the second axial range of movement, wherein the first and second pistons are disposed in a coaxial arrangement one around another.

18. The method of claim 17, wherein axially moving the first piston is in a first axial direction to bias the first fastener in the first radial range of movement, axially moving the second piston is in a second axial direction to bias the second fastener in the second radial range of movement, and the first and second axial directions are opposite from one another.

19. The method of claim 17, wherein at least one of the first or second fluid chambers is disposed directly between the first and second pistons.

20. The method of claim 19, wherein the first piston is a first annular piston, the second piston is a second annular piston, and the first and second annular pistons overlap one another along an interface.

21. The method of claim 20, comprising at least one annular seal disposed along the interface.

22. The method of claim 17, comprising axially moving a floating piston between the first and second pistons, wherein the floating piston separates the first fluid chamber from the second fluid chamber.

23. The method of claim 22, wherein the first chamber expands between the first piston and the floating piston during the first axial range of movement, and the second chamber expands between the second piston and the floating piston during the second axial range of movement.

24. The method of claim 22, wherein the first piston, the second piston, and the floating piston are disposed in the coaxial arrangement one around another.

25. The method of claim 24, wherein the first piston is configured to move axially away from the second piston and the floating piston to cause the first fastener to move radially with the first radial range of movement, wherein the second piston is configured to move axially away from the first piston and the floating piston to cause the second fastener to move radially with the second radial range of movement.

26. The method of claim 17, wherein the second fastener comprises a segmented fastener having a plurality of radially movable segments disposed in an annular configuration, and each segment of the plurality of radially movable segments is spring loaded by a spring.

* * * * *